(12) United States Patent
Houlding et al.

(10) Patent No.: US 7,698,429 B1
(45) Date of Patent: Apr. 13, 2010

(54) SYSTEM AND METHOD FOR CUSTOMIZING A CORE PRODUCT

(75) Inventors: David I. Houlding, Tampa, FL (US);
Sekar Govindasamy, Tampa, FL (US);
Stephen Frye, Fairview, TX (US)

(73) Assignee: Perot Systems Corporation, Plano, TX (US)

( * ) Notice: Subject to any disclaimer, the term of this patent is extended or adjusted under 35 U.S.C. 154(b) by 1191 days.

(21) Appl. No.: 10/830,175

(22) Filed: Apr. 22, 2004

(51) Int. Cl.
*G06F 13/00* (2006.01)
(52) U.S. Cl. ..................................................... 709/226
(58) Field of Classification Search .................. 709/226
See application file for complete search history.

(56) References Cited

U.S. PATENT DOCUMENTS

| | | | |
|---|---|---|---|
| 6,249,769 B1 | 6/2001 | Ruffin | |
| 6,526,387 B1 | 2/2003 | Ruffin | |
| 6,560,633 B1 * | 5/2003 | Roberts et al. | 709/202 |
| 6,721,746 B2 | 4/2004 | Zulpa | |
| 6,789,252 B1 * | 9/2004 | Burke et al. | 717/100 |
| 7,254,624 B2 * | 8/2007 | Kinyon et al. | 709/220 |
| 7,334,038 B1 * | 2/2008 | Crow et al. | 709/227 |

* cited by examiner

*Primary Examiner*—Robert B Harrell
(74) *Attorney, Agent, or Firm*—Winstead PC (57) ABSTRACT

An enterprise framework for a Service Oriented Architecture (SOA) is disclosed. The enterprise framework is utilized for creating, replacing, or modifying services on the SOA without modifying core code. With the framework, a service client may access services provided by the SOA via any middleware available now or in the future by utilizing auto-generation of middleware bindings via templates.

26 Claims, 7 Drawing Sheets

SYSTEM AND METHOD FOR CUSTOMIZING A CORE PRODUCT

BACKGROUND OF THE INVENTION

1. Technical Field

The present invention generally relates to Service Oriented Architectures (SOAs), and more particularly, but not by way of limitation, to an enterprise framework for creating, replacing, or modifying services on the SOA.

2. Background of the Related Art

Many service oriented architectures available today provide a generic system to meet customer needs that are common to a variety of customers. Although many architectures strive to meet most customer needs out of the box, it may not be possible to meet all customer needs in a core product that is sold to a large customer base. As such, many customers must extend or modify the behavior of the core product (e.g., core code base of service implementations within the SOA) to meet their specific needs. Modifications may also require access to source code and are generally more costly and difficult to maintain throughout upgrades etc. The term "core product" as defined herein refers to any item delivered in a product intended for more than one customer. The term "custom" as defined herein refers to any item added by a customer to supplement or change the core product (i.e., a supplement or change that is not shared by more than one customer). Source code may be in the core product or custom product, as well as any item supporting the source code, such as, configuration and deployment descriptors.

Furthermore, many customers customize the core product without consulting the core product provider. As a result, many customizations result in pervasive changes to the core product. For example, many customizations are currently accomplished via surround code and include new tables and stored procedures. Alteration of existing tables may disrupt standard product functions posing support issues. As illustrated above, by altering the core product, costs significantly increase for customers when attempting to upgrade the core product. For example, many customers may not be able to forward fit their customizations into the new upgraded core product. This, in turn, has lead to many customers resisting upgrades and/or using product combinations in non-standard configurations that may cause support and product management issues.

In addition, many architectures may not provide for easy integration with third party products either in front or behind service interfaces. For example a customer may wish to add a new service or replace a generic service with another third party product. Again, customers in today's market alter the core product in order to implement third party products, which may lead to complications when an upgrade or additional new products are available for the core product.

BRIEF SUMMARY OF THE INVENTION

The present invention relates to a system for at least one of specializing, replacing, and adding services of a service oriented architecture. In one aspect of the invention, the system includes a core product for utilization by a customer, the core product being generic in nature, and a framework for at least one of specializing, replacing, and adding services of the core product, wherein the at least one of specializing, replacing, and adding services does not include alteration of the core product.

In another aspect, the present invention relates to a method for at least one of specializing, replacing, and adding services of a service oriented architecture. The method includes the steps of creating a core product for utilization by a customer, the core product being generic in nature, and creating a framework for at least one of specializing, replacing, and adding services of the core product, wherein the at least one of specializing, replacing, and adding services does not include alteration of the core product.

BRIEF DESCRIPTION OF THE DRAWINGS

For a more complete understanding of the present invention, and for further objects and advantages thereof, reference is made to the following description taken in conjunction with the accompanying drawings in which.

DETAILED DESCRIPTION OF THE INVENTION

Embodiments of the present invention include an enterprise framework for an SOA that allows specialization of the implementation of existing services, replacement of the implementation of existing services, and/or creation of new services and web applications. In addition, a service client may access services provided by the SOA via any middleware available now or in the future by utilizing auto-generation of middleware bindings via templates.

Figure 1:
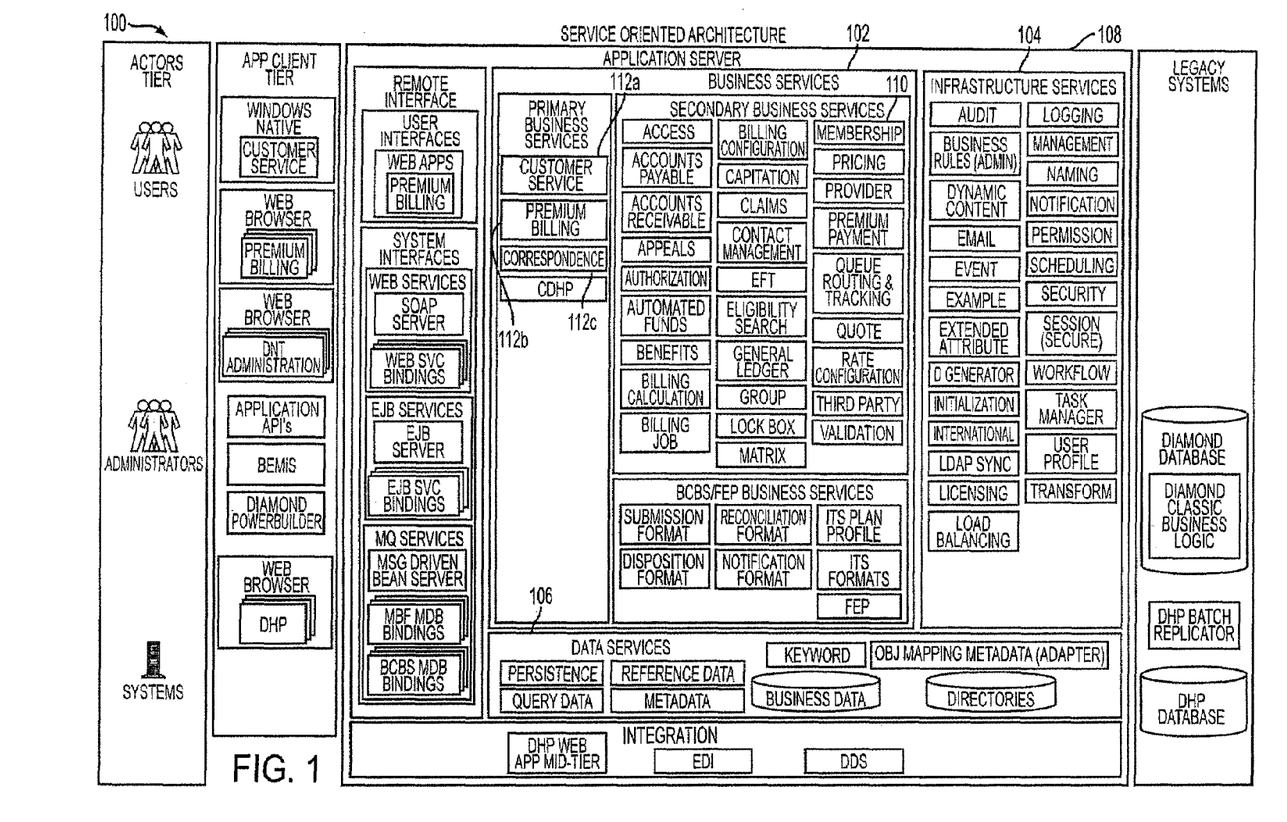
FIG. 1 is a block diagram of a multi-tiered architecture in accordance with an embodiment of the present invention.

Referring now to FIG. 1, a multi-tiered architecture in accordance with an embodiment of the present invention is illustrated. Services offered by the SOA 100 include business, infrastructure, and data services as shown in the business services tier 102, infrastructure services tier 104, and data services tier 106 respectively. Each business service of the business services tier 102 may be application specific and encapsulate business logic. For example, the business services tier 102 includes applications such as customer service 112a, premium billing 112b, correspondence 112c, and a variety of other applications. An infrastructure service, such as those illustrated in the infrastructure services tier 104, may be a general purpose, horizontal service that may not be application specific and does not have business logic. The data services tier 106 relates to services that are general purpose and related to data access. Access to the data may be either read-only or read-write in nature. Although the architecture is illustrated with specific tiers, applications, modules, databases, etc. it will be understood by one skilled in the art that the multi-tier architecture may be have various different tiers, etc. not illustrated in FIG. 1. In addition, the mid-tier, or application server 108, is capable of numerous different deployment configurations and therefore the configuration, as illustrated in FIG. 1, is merely exemplary in nature.

A customer is provided with a core product (e.g., a non-customized version of the SOA 100) that may be customized, as desired, by the customer. For example, a customer may desire to customize a membership service module 110 deployed in the core product. The customization may entail modifying or replacing the standard membership database associated with the membership service module 110 with a customized membership database. In accordance with embodiments of the present invention, the membership service module 110 may be customized while the remainder of the SOA 100 maintains functionality without alteration. Although the above example illustrates modifying or replacing a membership database of a membership service module, it will be understood by one skilled in the art that various modifications or replacements may be made to portions of a module other than the database and various other modules may be modified or replaced such as a pricing module, third party module, validation module, etc. Application clients may be external systems or user interface application clients. Services may be invoked via various middleware bindings (e.g., Web Service, EJB, MQ) auto-generated during the build.

Figure 2:
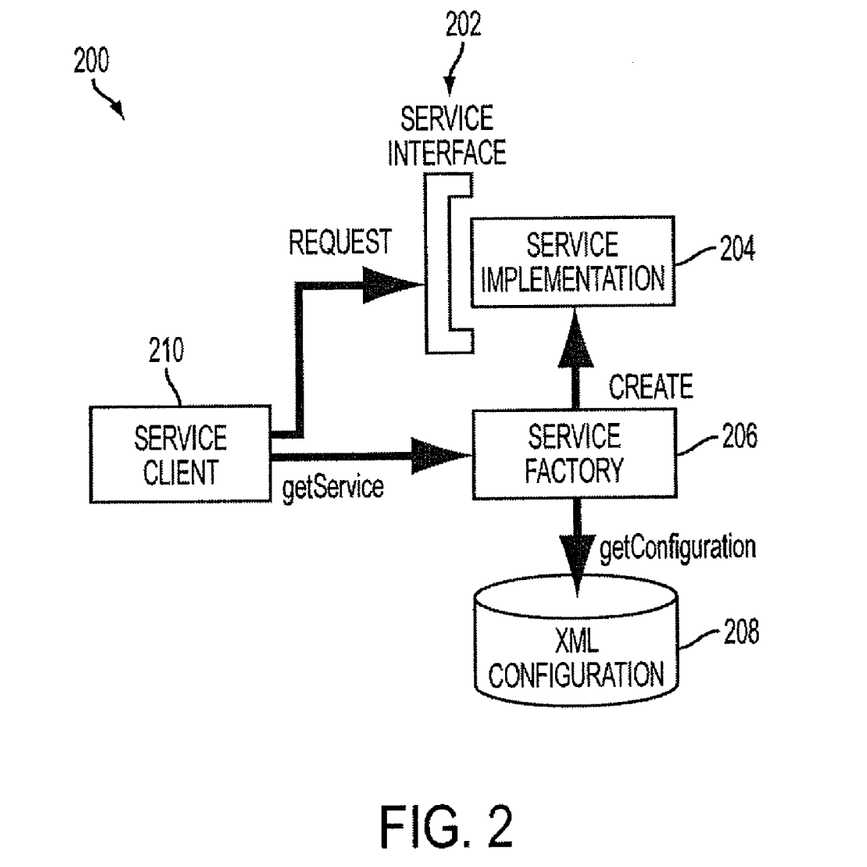
FIG. 2 is a service pattern of an enterprise framework in accordance with an embodiment of the present invention.

Referring now to FIG. 2, a service pattern 200 of an enterprise framework in accordance with an embodiment of the present invention is illustrated. Each service of the SOA 100 adheres to a well-defined architectural service pattern 200 including a service interface 202, a service implementation 204, and a service factory 206. The service implementation 204 may be pluggable and is defined in an XML configuration 208. Each service may have one or multiple service implementations 204. The service implementation 204 used at any particular time depends on the XML configuration 208 of the system.

A service client 210 retrieves a handle to a particular service by requesting, via a getService command, an instance of the particular service from the service factory 206. The service factory 206 create an instance of the service if one does not already exist. The instance is created based on data retrieved from the XML configuration via a getConfiguration command. A build process takes a service definition, specifically the service interface 202, with instructions as to how the service is to be accessed, and then auto-generates necessary remote interfaces and bindings required to support that access by the service client 210.

Figure 3:
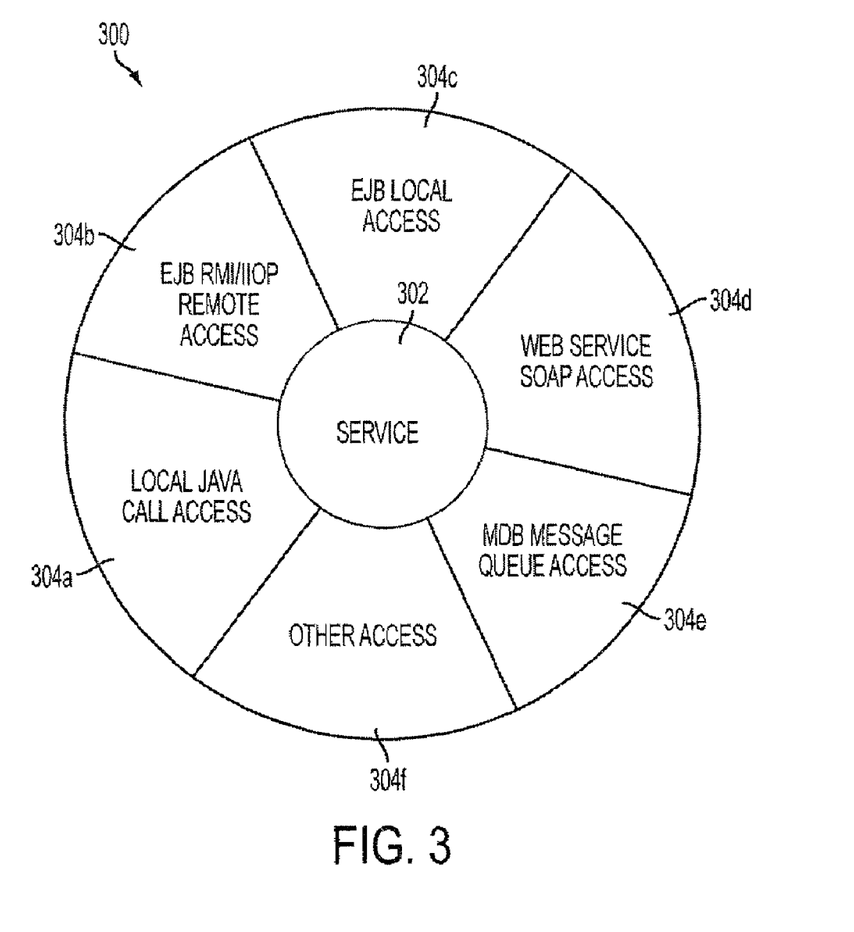
FIG. 3 is a block diagram of middleware access to a service.

Referring now to FIG. 3, a block diagram 300 of middleware access to a service 302 is illustrated. Middleware bindings for all supported middlewares 304a-f may be auto-generated during an SOA 100 build as set forth above. Key information may be provided in Java XDoclet tag format in the interfaces of the services to influence the generation of the middleware bindings. A given service 302 may be accessed by the service client 210 at runtime concurrently via one or more of the available middlewares 304a-f (e.g., via EJB, web services, message queues, etc.). Access to the services 302 across the SOA 100 using new middleware 304f in the future may be added through addition of template support for the generation of bindings for the new middleware during a build.

In accordance with embodiments of the present invention, new services may be rapidly created and the middleware bindings may be automatically generated. The code generation is template driven, allowing generation of new templates for new types of middleware 304 as well as new middleware bindings for various services 302. In addition to middleware bindings, code to support security authorizations, as well as other items, may also be auto-generated. Accordingly, services 302 may be defined independent of any of the middleware complexities and security may be improved by incorporating such authorizations automatically and consistently.

Figure 4:
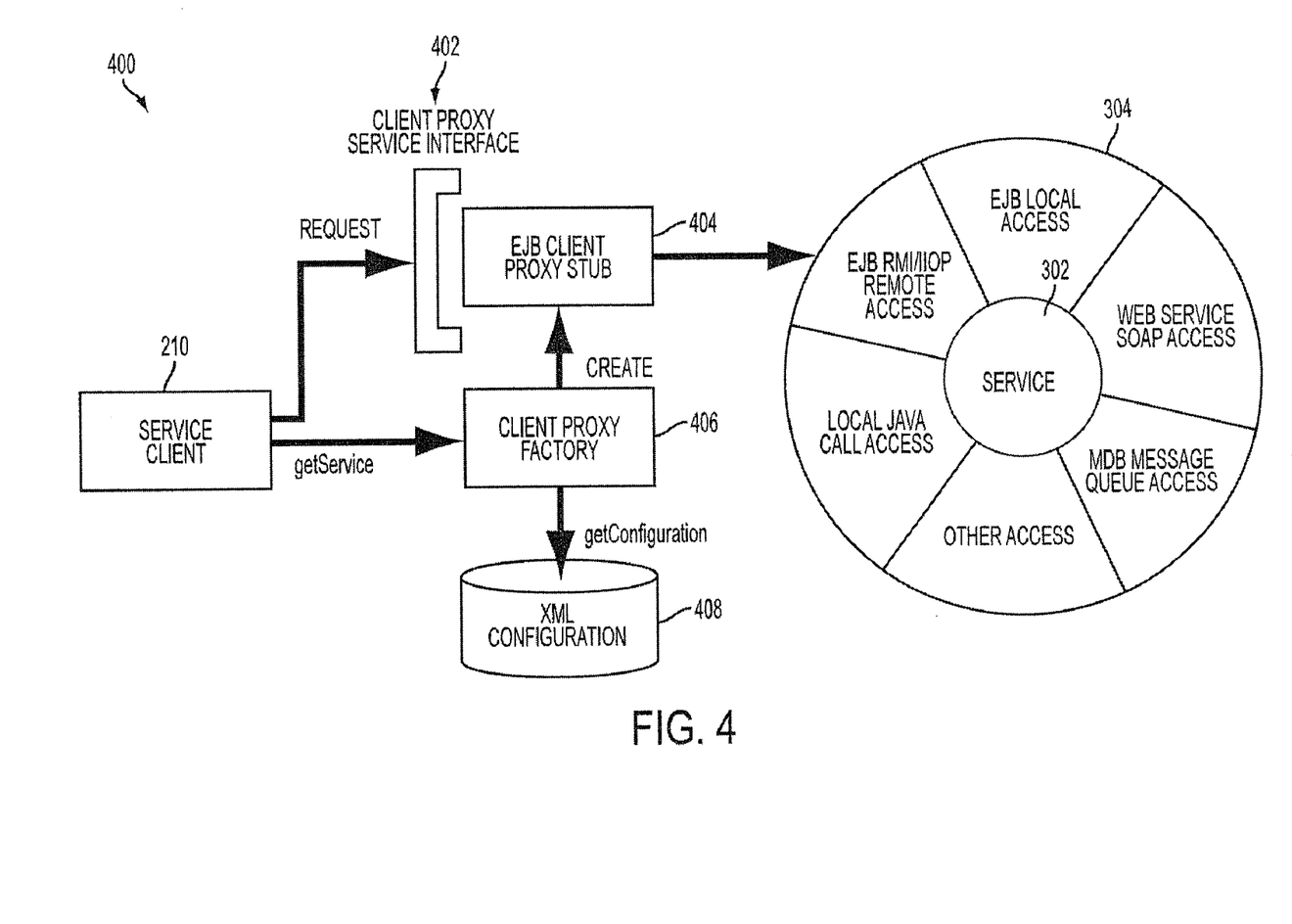
FIG. 4 is a block diagram illustrating access via a client proxy in accordance with an embodiment of the present invention.

Referring now to FIG. 4, a block diagram 400 illustrating access via a client proxy in accordance with an embodiment of the present invention is illustrated. In the past, service clients 210 were directly involved in the complexities of accessing services via different middlewares 304, including the lookup of the naming service, lifecycle, etc. for each type of middleware 304. However, in accordance with an embodiment of the present invention, service clients 210 may access a service 302 via a client proxy 402, thereby abstracting the service client 210 from middleware complexities. Utilizing a client proxy 402 enables the service client 210 to become generic with respect to any of the available types of middleware 304. Given a specific service 302, the supporting build process automatically generates the client proxy interfaces 402 and bindings by which any service client 210 may retrieve a handle to the client proxy interface 402 for any service 302.

When the service client 210 requests an instance of a service from the client proxy factory 406 via a getService command, a proxy or a stub is instantiated in order to allow access to a particular service 302. The XML configuration 408 defines the type of stub instantiated by the client proxy factory 406 for the service client 210. For example, if a given service client 210 interfaces with a particular service 302 using EJB, then the service factory 406 creates an EJB client proxy stub 404. The service client 210 may interface with a service 302 utilizing web services and, in this, case a different client proxy stub 404 is generated. Although FIG. 4 illustrates a service client 210 utilizing an EJB client proxy stub 404 to interface with a particular service 302, the service client 210 may, at any time, interface with a particular service 302 via any number of middlewares 304, or multiple middlewares 304 concurrently, and the client proxy stub 404 is generated in accordance with the middleware or middlewares 304 utilized by the service client 210. In accordance with embodiments of the present invention, the service client 210 may remain independent of the middleware 304 (i.e., the middleware may be changed at a future point without recoding the service client 210). For example, a single test case may be written that exercises a service 302 via any of the supported middlewares 304. In addition, the service client 210 may not be burdened with choosing a type of middleware 304 at development time. In accordance with embodiments of the present invention, access to services 302 may be optimized by choosing a type of middleware 304 dependent on the physical configuration, such as the service client 210 and middle tier location.

Figure 5:
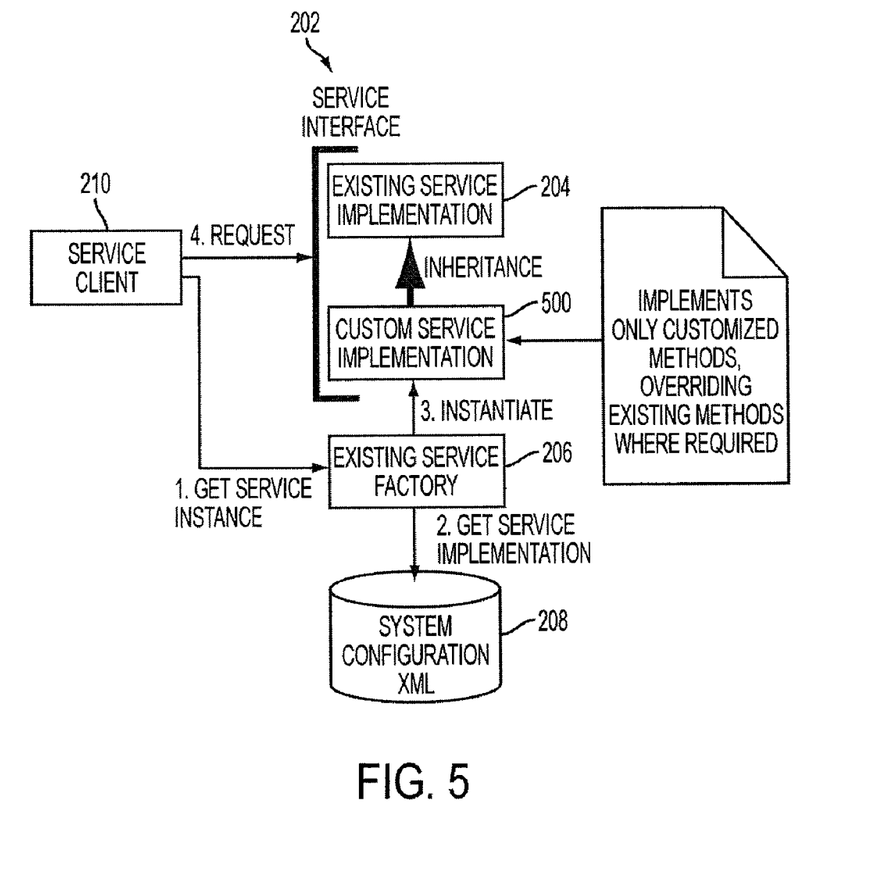
FIG. 5 is a block diagram illustrating a method of specializing an existing service in accordance with an embodiment of the present invention.

Referring now to FIG. 5, a block diagram illustrating a method of specializing an existing service implementation 204 is shown. An existing service implementation 204 may be specialized when an existing service implementation 204 is similar to the service needed by the customer, but some specializations are necessary. To perform this customization, the existing service interface 202 is utilized, however, a modified or new custom service implementation 500 may be developed for the service in question. This custom service implementation 500 Java class may subclass the existing service implementation 204. The XML configuration 208 is then updated with the name of the newly created class. The new class overrides the method in the existing service implementation and may call super class methods where necessary depending on the nature of the specialization.

In this type of customization, the existing service implementation 204 is not altered, however, select methods of the existing service implementation 204 are overridden in order to slightly customize the behavior of the service 302. For example, a customer may desire to retrieve or integrate supplemental custom information for each member before returning members to the service client 210. In this case, the customer may specialize an existing membership service implementation 204 and override methods of the existing service implementation 204 to retrieve members. The custom service implementation 500 may call a super method to get a baseline member set. A custom database could then be queried for each member to get custom information and add this information to the members before returning them to the service client 210.

Figure 6:
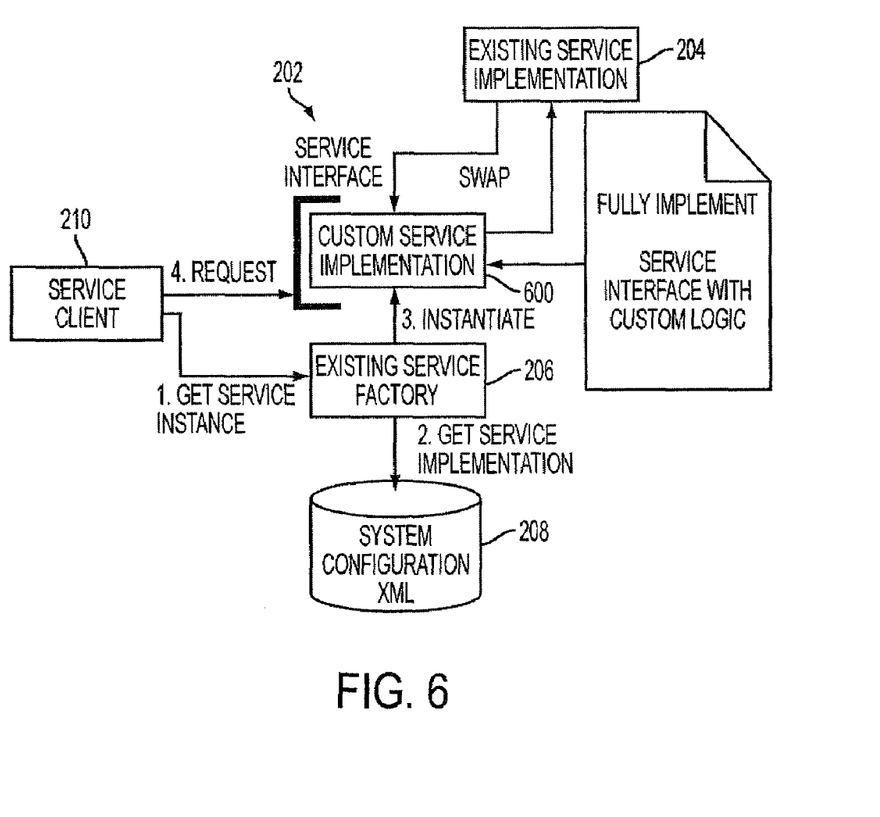
FIG. 6 is a block diagram illustrating a method of replacing an existing service in accordance with an embodiment of the present invention.

Referring now to FIG. 6, a block diagram illustrating a method of replacing an existing service implementation 204 is shown. An existing service implementation 204 may be replaced when a customer identifies a specific existing service implementation 204 that is required to exhibit a functionality different than that provided by the core product. For example, a customer may wish to integrate with one of the customer's legacy systems or a specific third party product. Instead of selectively overriding methods of the existing service implementation 204, the existing service implementation 204 is replaced with a new custom service implementation 600. Alternatively, the existing service implementation 204 may be replaced with an adaptor that bridges in a third party product.

When replacing the existing service implementation 204, the existing service interface 202 is utilized, while the existing service implementation 204 is replaced with a custom service implementation 600. The custom service implementation 600 functions as a stand alone implementation. In other words, the existing service implementation 204 is not subclassed and no methods are called on the existing service implementation 204.

Figure 7:
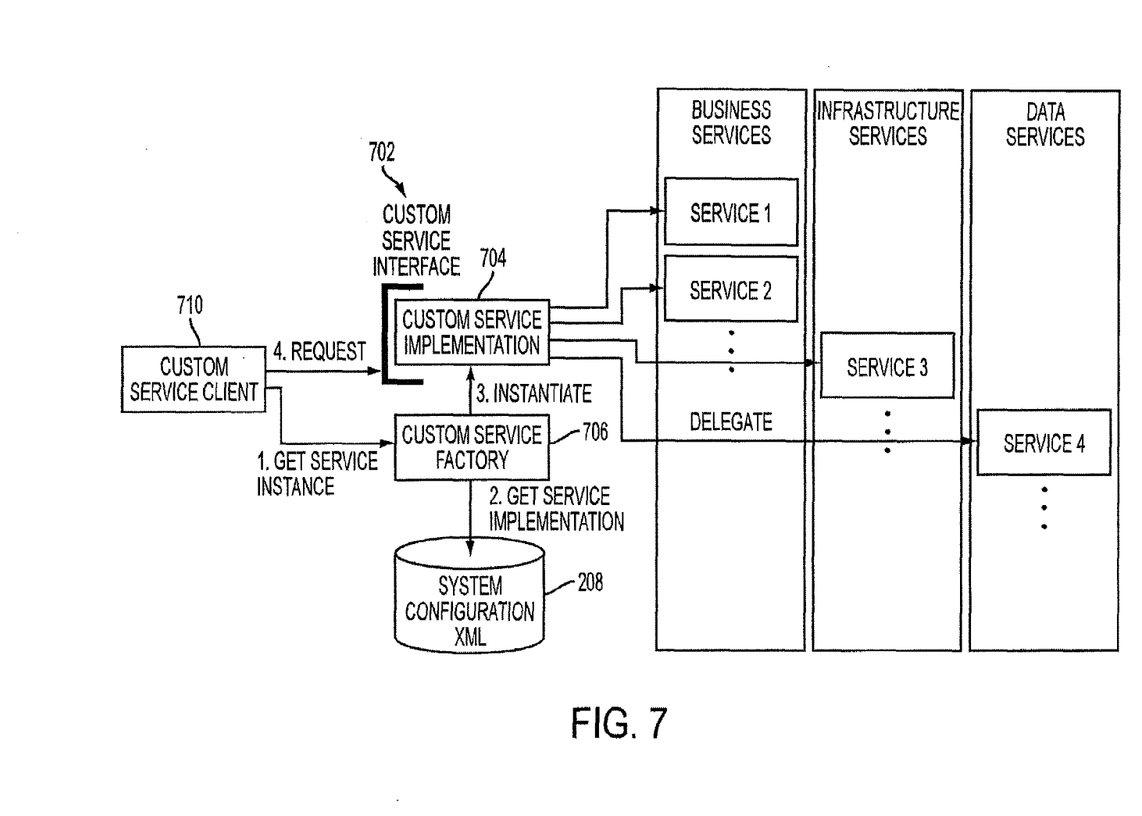
FIG. 7 is a block diagram illustrating a method of adding a new service in accordance with an embodiment of the present invention.

Referring now to FIG. 7, a block diagram illustrating a method of implementing a new service is illustrated. A new service may be added when a customer requires a service that does not exist in the core product. After the customer defines a new custom service interface 702, it is run through a build. The middleware bindings and other supporting artifacts may be automatically generated and the newly added service may be added to an administration console similar to the existing services 302 provided in the core product.

When adding a new service 302, a new custom service interface 702 and custom service implementation 704 are created. During the build process, tags in the new custom service interface 702 specify how to generate various artifacts supporting the new custom service including but not limited to middleware bindings, and deployment descriptors. At the end of the build process the new custom service, together with supporting artifacts, is packaged together with the core services and deployed so that the new custom service may run together with core services once the application server platform supporting the services is started.

It is thus believed that the operation and construction of embodiments of the present invention will be apparent from the foregoing description. While the method and apparatus shown or described have been characterized as being preferred it will be obvious that various changes and modifications may be made therein without departing from the spirit and scope of the invention.

What is claimed is:

1. A method for customizing a core product, the method comprising the steps of:
    creating a core product for utilization by more than one customer, the core product comprising core code, the core product being a service-oriented architecture;
    on at least one hardware server, creating a framework for customizing the core product to create a customized service-oriented architecture, the customized service-oriented architecture meeting a service need of at least one specific customer that is not met by the core product;
    wherein the service-oriented architecture comprises a plurality of existing service implementations;
    wherein the framework creates the customized service-oriented architecture by at least one of:
        specializing at least one of the plurality of existing service implementations; and
        replacing at least one of the plurality of existing service implementations;
    wherein the customized service-oriented architecture includes and functionally utilizes the core product in unaltered form along with any specialized or replacing services; and
    wherein the at least one of specializing or replacing comprises generation of new code based on the service need of the at least one specific customer.

2. The method of claim 1, wherein the step of creating a framework comprises the steps of:
    creating a first service implementation as defined in an XML configuration;
    requesting, by a service client, a service implementation;
    creating, by a service factory, the first service implementation; and
    allowing access, by a service interface, to the first service implementation by the service client.

3. The method of claim 2, further comprising the step of accessing a particular service via at least one middleware, wherein the service client remains independent of the at least one middleware.

4. The method of claim 3, further comprising automatically generating middleware bindings for the at least one middleware during a build operation.

5. The method of claim 4, wherein the step of automatically generating comprises generating the middleware bindings via templates.

6. The method of claim 5, further comprising automatically generating a middleware binding for a new middleware via a new template.

7. The method of claim 3, wherein the at least one middleware comprises at least one of Web Services, EJB local access, EJB remote access, local Java call access, and MDB message queue access.

8. The method of claim 3, wherein accessing the particular service via the at least one middleware comprises utilizing a client proxy stub.

9. The method of claim 2, further comprising the step of specializing the first service implementation by creating a new custom service implementation and subclassing the first service implementation.

10. The method of claim 9, further comprising the step of overriding select methods of the first service implementation by the new custom service implementation.

11. The method of claim 2, further comprising the step of replacing the first service implementation by creating a new custom service implementation and replacing the first service implementation with the new custom service implementation.

12. The method of claim 2, further comprising adding a new custom service implementation by creating a new custom service implementation, a new custom service factory, a new custom service client, and a new custom service interface.

13. A system for customizing a core product, the system comprising:

a core product comprising core code, the core product being a service-oriented architecture for use by more than one customer;

at least one hardware server, the at least one hardware server providing a framework for customizing the core product to create a customized service-oriented architecture, the customized service-oriented architecture meeting a service need of at least one specific customer that is not met by the core product;

wherein the service-oriented architecture comprises a plurality of existing service implementations;

wherein the at least one hardware server utilizes the framework to create the customized service-oriented architecture by at least one of:

specializing at least one of the plurality of existing service implementations; and replacing at least one of the plurality of existing service implementations;

wherein the customized service-oriented architecture includes and functionally utilizes the core product in unaltered form along with any specialized or replacing service implementations; and wherein the at least one of specializing and replacing comprises generation of new code based on the service need of the at least one specific customer.

14. The system of claim 13, wherein the framework comprises:

wherein the plurality of existing service implementations are defined in an XML configuration;

a service client for requesting a service implementation;

a service factory for creating the requested service implementation; and a service interface for allowing access to the requested service implementation by the service client.

15. The system of claim 14, further comprising at least one middleware for accessing a particular service, wherein the service client remains independent of the at least one middleware.

16. The system of claim 15, wherein a plurality of middleware bindings for the at least one middleware are automatically generated during a build operation.

17. The system of claim 16, wherein the plurality of middleware bindings are generated via templates.

18. The system of claim 17, wherein a middleware binding for a new middleware is generated automatically via a new template.

19. The system of claim 15, wherein the at least one middleware comprises at least one of Web Services, EJB local access, EJB remote access, local Java call access, and MDB message queue access.

20. The system of claim 15, wherein a client proxy stub is instantiated to allow access to the particular service through the at least one middleware.

21. The system of claim 14, wherein, if the at least one existing service implementation is specialized, a new custom service implementation is created and the at least one existing service implementation is subclassed.

22. The system of claim 21, wherein select methods of the at least one existing service implementation are overridden by the new custom service implementation.

23. The system of claim 14, wherein, if the at least one existing service implementation is replaced, a new custom service implementation is created and the at least one existing service implementation is replaced with the new custom service implementation.

24. The system of claim 14, wherein, if a new custom service is added, a new custom service implementation, a new custom service factory, a new custom service client, and a new custom service interface are created.

25. The system of claim 13, wherein the framework creates a customized core product by specializing at least one of the plurality of existing service implementations.

26. The system of claim 13, wherein the framework creates a customized core product by replacing at least one of the plurality of existing service implementations.

* * * * *